United States Patent
Xu

(10) Patent No.: US 11,768,588 B2
(45) Date of Patent: Sep. 26, 2023

(54) WINDOW OVERLAY DISPLAY PROCESSING METHOD AND APPARATUS, AND ELECTRONIC DEVICE

(71) Applicant: Hangzhou Hikvision Digital Technology Co., Ltd., Hangzhou (CN)

(72) Inventor: Feng Xu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/759,012

(22) PCT Filed: Jan. 15, 2021

(86) PCT No.: PCT/CN2021/072273
§ 371 (c)(1),
(2) Date: Jul. 18, 2022

(87) PCT Pub. No.: WO2021/143880
PCT Pub. Date: Jul. 22, 2021

(65) Prior Publication Data
US 2023/0034959 A1    Feb. 2, 2023

(30) Foreign Application Priority Data

Jan. 19, 2020 (CN) .......................... 202010062553.5

(51) Int. Cl.
*G06F 5/14* (2006.01)
*G06F 3/0484* (2022.01)
(Continued)

(52) U.S. Cl.
CPC ........... *G06F 3/0484* (2013.01); *G09G 5/377* (2013.01); *G06F 3/14* (2013.01); *G09G 5/14* (2013.01)

(58) Field of Classification Search
None
See application file for complete search history.

(56) References Cited

U.S. PATENT DOCUMENTS 5,475,812 A * 12/1995 Corona .................... G09G 5/14
715/807
2006/0203001 A1* 9/2006 Van Der Stok ........ H04N 21/47
345/562
(Continued)

FOREIGN PATENT DOCUMENTS

CN    102929478    2/2013
CN    106792101    5/2017
(Continued)

OTHER PUBLICATIONS

CN106792101A (English Translation) Title: "Method and device for regulating home page interface and smart television" Inventor: Liu, Chenglong, published on May 31, 2017 (Year: 2017).*
(Continued)

*Primary Examiner* — Rinna Yi
(74) *Attorney, Agent, or Firm* — NORTON ROSE FULBRIGHT US LLP

(57) ABSTRACT

Provided are a window overlay display processing method and apparatus, and an electronic device. The method comprises: in a process of overlay-displaying a following window on a main window, capturing an image of display content of the following window according to an image capture time interval (S501); and displaying the captured image at a display position corresponding to the following window in the main window (S502). By means of the above method, when the display level of the main window is higher than that of the following window, the main window still displays the captured image corresponding to the display content of the following window. In this way, the user will think that he/she is continuing to view the display content of (Continued)

the following window, and will not feel flickering visually, thus improving the display effect of the following window and enhancing the user experience of viewing the following window.

14 Claims, 8 Drawing Sheets

(51) Int. Cl.
  *G09G 5/377* (2006.01)
  *G06F 3/14* (2006.01)
  *G09G 5/14* (2006.01)

(56) References Cited

U.S. PATENT DOCUMENTS

| | | | |
|---|---|---|---|
| 2010/0073371 A1* | 3/2010 | Ernst | G09G 5/393 345/428 |
| 2015/0128069 A1 | 5/2015 | Ouyang et al. | |
| 2015/0227334 A1* | 8/2015 | Dostal | G09G 5/14 345/589 |
| 2016/0216797 A1 | 7/2016 | Geng et al. | |
| 2017/0010760 A1* | 1/2017 | Rapport | G06F 3/033 |
| 2017/0039446 A1* | 2/2017 | Silny | H04N 23/60 |
| 2018/0176965 A1* | 6/2018 | Mathias | G06F 3/02 |
| 2019/0103071 A1 | 4/2019 | Chen | |
| 2020/0050983 A1* | 2/2020 | Balasubramanian | G06F 11/3423 |
| 2020/0117325 A1* | 4/2020 | VanBlon | G06F 40/279 |

FOREIGN PATENT DOCUMENTS

| | | |
|---|---|---|
| CN | 109240629 | 1/2019 |
| CN | 109831688 | 5/2019 |
| CN | 111427523 | 7/2020 |
| RU | 2637882 | 12/2017 |
| WO | WO 2016/187423 | 11/2016 |
| WO | WO 2017113713 | 7/2017 |
| WO | WO 2018126971 | 7/2018 |
| WO | WO 2019/242435 | 12/2019 |

OTHER PUBLICATIONS

JP2008-257424A (English Translation) Title: "Terminal monitoring method, terminal monitor and terminal monitoring program" Inventor: Kenji, Nagao published on Oct. 23, 2008 (Year: 2008).*
International Search Report and Written Opinion issued in Corresponding PCT Application No. PCT/CN2021/072273, dated Apr. 22, 2021 (English machine translation).
Extended European Search Report issued in corresponding European Application No. 21741325.1, dated May 31, 2023.
Office Action issued in corresponding Russian Application No. 2022122283, dated Mar. 13, 2023.

* cited by examiner

WINDOW OVERLAY DISPLAY PROCESSING METHOD AND APPARATUS, AND ELECTRONIC DEVICE

CROSS REFERENCE TO RELATED APPLICATIONS

The present application is a national phase application under 35 U.S.C. § 371 of International Application No. PCT/CN2021/072273, filed Jan. 15, 2021, which claims the benefit of priority to Chinese patent application No. 202010062553.5 filed with the China National Intellectual Property Administration on Jan. 19, 2020 and entitled "WINDOW OVERLAY DISPLAY PROCESSING METHOD AND APPARATUS, AND ELECTRONIC DEVICE", each of which are incorporated herein by reference in their entirety.

TECHNICAL FIELD

The present application relates to a technical field of images, in particular to a window overlay display processing method and apparatus and an electronic device.

BACKGROUND

With the development of electronic device technology, various kinds of Applications (APPs) are installed in electronic devices. These applications include a first application and a second application. The first application is a program running in a task manager of the electronic device. The first application does not create an independent display window by default, but needs to establish a connection with the second application in the electronic device, and create a following window on demand through an interaction using instructions with the second application. Then, the following window can be overlaid and displayed on the main window corresponding to the second application.

In the related art, the first application monitors a display position change information of the main window corresponding to the second application in real time, and adjusts the display position of the following window corresponding to the first application in real time according to the display position change information, so that the display position of the following window changes with the display position of the main window. Since the following window corresponding to the first application and the main window corresponding to the second application are two different applications in the electronic device, when the user clicks the main window corresponding to the second application, the display level of the main window will be higher than that of the following window corresponding to the first application, so that the main window will overlay the following window. When monitoring that the display level of the main window is higher than that of the following window, the first application will reset the display level of the following window to be higher than that of the main window, so that the user can view the following window again.

It can be seen that in the related art, when the display level of the main window is higher than that of the following window, the main window will overlay the following window. Although the first application subsequently resets the display level of the following window to be higher than that of the main window, there is a flickering process visually for the user, resulting in poor display effect of the following window.

SUMMARY

Embodiments of the present application provides a window overlay display processing method and apparatus and an electronic device, so as to solve the problem of poor display effect of the following window in related art.

In a first aspect, an embodiment of the present application provides a window overlay display processing method, including:

in a process of overlay-displaying a following window on a main window, capturing an image of display content of the following window according to an image capture time interval;

displaying the captured image at a display position corresponding to the following window in the main window.

In a possible implementation, before capturing the image of the display content of the following window according to the image capture time interval, the method further includes:

determining the image capture time interval based on the display content of the following window.

In a possible implementation, determining the image capture time interval based on the display content of the following window includes:

if the display content of the following window includes a non-video content, determining that the image capture time interval is equal to a preset push time interval; or, if the display content of the following window includes a video content, determining the image capture time interval based on a video frame rate of the video content.

In a possible implementation, determining the image capture time interval based on the video frame rate of the video content includes:

determining a display duration of each video image based on the video frame rate of the video content;

determining whether the display duration of each video image is greater than the preset push time interval;

if the display duration of each video image is greater than the preset push time interval, determining that the image capture time interval is equal to the preset push time interval; or, if the display duration of each video image is not greater than the preset push time interval, rounding down the display duration of each video image to a nearest integer to obtain the image capture time interval; or, if the display duration of each video image is not greater than the preset push time interval, rounding down the display duration of each video image to a nearest multiple of 10 ms to obtain the image capture time interval.

In a possible implementation, if the following window includes a plurality of sub-windows, each of which is used to play a corresponding sub-video content, the video frame rate of the video content is a maximum video frame rate among video frame rates of the sub-video contents corresponding to the plurality of sub-windows.

In a possible implementation, capturing the image of the display content of the following window according to the image capture time interval includes:

when it is monitored that the following window is in focus, capturing the image of the display content of the following window according to the image capture time interval;

when the following window is in focus, a display level of the following window is higher than that of the main window.

In a possible implementation, capturing the image of the display content of the following window according to the image capture time interval includes:

if it is monitored that the number of sub-windows included in the following window is greater than a preset value, capturing the image of the display content of the following window according to an increased image capture time interval.

In a possible implementation, the method further includes:

when it is monitored that the main window is in focus, stopping capturing the image of the display content of the following window according to the image capture time interval.

In a possible implementation, the method further includes:

when it is monitored that a display level of the following window is higher than that of the main window after it is monitored that the main window is in focus, stopping capturing the image of the display content of the following window according to the image capture time interval.

In a possible implementation, the main window is a display window of a browser in an electronic device; and/or, the following window is a video display window of a local service in the electronic device.

In a second aspect, an embodiment of the present application provides a window overlay display processing apparatus, including:

an image capturing module configured for, in a process of overlay-displaying a following window on a main window, capturing an image of display content of the following window according to an image capture time interval;

a displaying module configured for displaying the captured image at a display position corresponding to the following window in the main window.

In a third aspect, an embodiment of the present application provides window overlay display processing apparatus, including an application for a following window and an application for a main window;

wherein the application for the following window is configured for, in a process of overlay-displaying the following window on the main window, capturing an image of display content of the following window according to an image capture time interval, and pushing the captured image to the application for the main window;

the application for the main window is configured for displaying the captured image at a display position corresponding to the following window in the main window.

In a possible implementation, the application for the following window is further configured for:

before capturing the image of the display content of the following window according to the image capture time interval, determining the image capture time interval based on the display content of the following window.

In a possible implementation, the application for the following window is specifically configured for:

if the display content of the following window includes a non-video content, determining that the image capture time interval is equal to a preset push time interval; or, if the display content of the following window includes a video content, determining the image capture time interval based on a video frame rate of the video content.

In a possible implementation, the application for the following window is specifically configured for:

determining a display duration of each video image based on the video frame rate of the video content;

determining whether the display duration of each video image is greater than a preset push time interval;

if the display duration of each video image is greater than the preset push time interval, determining that the image capture time interval is equal to the preset push time interval; or, if the display duration of each video image is not greater than the preset push time interval, rounding down the display duration of each video image to a nearest integer to obtain the image capture time interval; or, if the display duration of each video image is not greater than the preset push time interval, rounding down the display duration of each video image to a nearest multiple of 10 ms to obtain the image capture time interval.

In a possible implementation, if the following window includes a plurality of sub-windows, each of which is used to play a corresponding sub-video content, the video frame rate of the video content is a maximum video frame rate among video frame rates of the sub-video contents corresponding to the plurality of sub-windows.

In a possible implementation, the application for the following window is specifically configured for:

when it is monitored that the following window is in focus, capturing the image of the display content of the following window according to the image capture time interval;

when the following window is in focus, a display level of the following window is higher than that of the main window.

In a possible implementation, the application for the following window is specifically configured for:

if it is monitored that the number of sub-windows included in the following window is greater than a preset value, capturing the image of the display content of the following window according to an increased image capture time interval.

In a possible implementation, the application for the following window is further configured for:

when it is monitored that the main window is in focus, stopping capturing the image of the display content of the following window according to the image capture time interval, and stopping pushing the captured image to the application for the main window.

In a possible implementation, the application for the following window is further configured for:

when it is monitored that a display level of the following window is higher than that of the main window after it is monitored that the main window is in focus, stopping capturing the image of the display content of the following window according to the image capture time interval, and stopping pushing the captured image to the application for the main window.

In a possible implementation, the application for the main window is a browser in an electronic device; and the main window is a display window of the browser; and/or, the application for the following window is a local service in the electronic device, and the following window is a video display window of the local service.

In a fourth aspect, an embodiment of the present application provides an electronic device including a processor and a memory;

wherein the memory is configured for storing program instructions;

the processor is configured for calling and executing the program instructions stored in the memory, and the electronic device is configured for executing the method according to any implementation of the first aspect when the processor executes the program instructions stored in the memory.

In a fifth aspect, an embodiment of the present application provides a computer-readable storage medium having stored instructions therein, wherein the instructions, when running on a computer, cause the computer to execute the method according to any implementation of the first aspect.

In a sixth aspect, an embodiment of the present application provides a computer program that, when running on a computer, causes the computer to execute the method according to any the implementation of the first aspect.

In the window overlay display processing method and apparatus and the electronic device according to the embodiments of the present application, in a process of overlay-displaying a following window on a main window, an image is captured of display content of the following window according to an image capture time interval; and the captured image is displayed at a display position corresponding to the following window in the main window, so that when the display level of the main window is higher than that of the following window, that is, when the main window overlays the following window, the main window still displays the captured image corresponding to the display content of the following window. In this way, the user will think that he/she is continuing to view the display content of the following window, and will not feel flickering visually, thus improving the display effect of the following window and enhancing the user experience of viewing the following window.

DETAILED DESCRIPTION

Firstly, application scenarios and some vocabularies related to embodiments of the present application are introduced.

Figure 1:
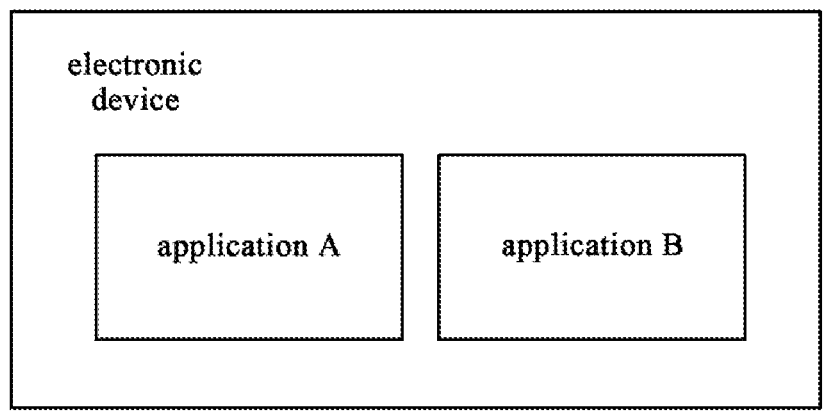
FIG. 1 is a schematic diagram of an application scenario provided by an embodiment of the present application.

FIG. 1 is a schematic diagram of an application scenario provided by an embodiment of the present application. As shown in FIG. 1, an application A and an application B may be installed in an electronic device mentioned in the embodiment of the present application, wherein the application A may be referred to as an application for a following window, and the application B may be referred to as an application for a main window.

Exemplarily, the application A may be a program running in a task manager of the electronic device. The application A does not create an independent display window by default, but needs to establish a connection with the application B in the electronic device, and create a following window on demand through an interaction using instructions with the application B. Then, the following window may be overlaid and displayed on a main window corresponding to the application B, so that the following window is overlaid and displayed on the main window according to a following mode.

It can be seen that after the following window is created, the display level of the following window is higher than that of the main window before the main window is in focus.

In this embodiment of the present application, the following window being overlaid and displayed on the main window according to the following mode means that the following window moves along with the display position of the main window.

Exemplarily, the application A or the application for the following window may be a local service in the electronic device, and correspondingly, the following window may be a video display window of the local service. The application B or the application for the main window may be a browser in the electronic device, and correspondingly, the main window may be a display window of the browser.

The connection established between the application A and the application B in the embodiment of the present application may include, but is not limited to, full-duplex communication protocol (Web Socket, WS) connection based on Transmission Control Protocol (TCP)/full-duplex communication security protocol (Web Socket Secure, WSS) based on TCP connection, or Hyper Text Transfer Protocol (HTTP)/Hyper Text Transfer Protocol over Secure Socket Layer (HTTPS) long polling connection.

The electronic device mentioned in the embodiments of the present application may include, but are not limited to, a desktop computer, an all-in-one computer, a notebook computer, a palmtop computer, and a tablet computer.

The browser mentioned in the embodiments of the present application may include, but are not limited to, a web browser (Internet Explorer, IE), Google Chrome, Apple Safari, Firefox browser (Mozilla Firefox, FX), etc.

For the image capture time interval mentioned in the embodiments of the present application, references can be made to the time interval of capturing an image of the display content of the following window by the electronic device.

Image capturing refers to converting all or part of the content displayed on a screen into a picture.

The following window mentioned in the embodiments of the present application may include one sub-window or a plurality of sub-windows (equivalent to dividing an entire window into a plurality of sub-windows), wherein each sub-window is respectively used to display a corresponding content. For example, the following window includes sub-window ①, sub-window ② and sub-window ③ and sub-window ④, wherein the sub-window ① is used to display content 1, the sub-window ② is used to display content 2, the sub-window ③ is used to display content 3, and the sub-window ④ is used to display content 4.

The focusing of the following window mentioned in the embodiments of the present application refers to that the user selects the following window through an input device such as a mouse, or the user selects the following window through touch. It can be understood that when the user selects a window corresponding to another application other than the following window through an input device such as a mouse, or the user selects a window corresponding to another application other than the following window through touch, the following window is out of focus.

After monitoring that the following window is in focus, the electronic device keeps the display level of the following window higher than that of the main window.

The focusing of the main window mentioned in the embodiments of the present application refers to that the user selects the main window through an input device such as a mouse, or the user selects the main window through touch. It can be understood that when the user selects a window corresponding to another application other than the main window through an input device such as a mouse, or selects a window corresponding to another application other than the main window through touch, the main window is out of focus.

In the case where the display level of the following window is higher than that of the main window, if it is monitored that the main window is in focus, the electronic device first sets the display level of the main window to be higher than that of the following window; then, the electronic device resets the display level of the following window to be higher than that of the main window; if the main window continues to be in focus subsequently, since the display level of the following window has been reset to be higher than that of the main window, the display level of the following window in the above electronic device keeps higher than that of the main window.

The numbers "first" and "second" in the embodiments of the present application are only used to distinguish similar objects, not necessarily to describe a specific order or sequence, and should not constitute any limitation on the embodiments of the present application.

Figure 2:
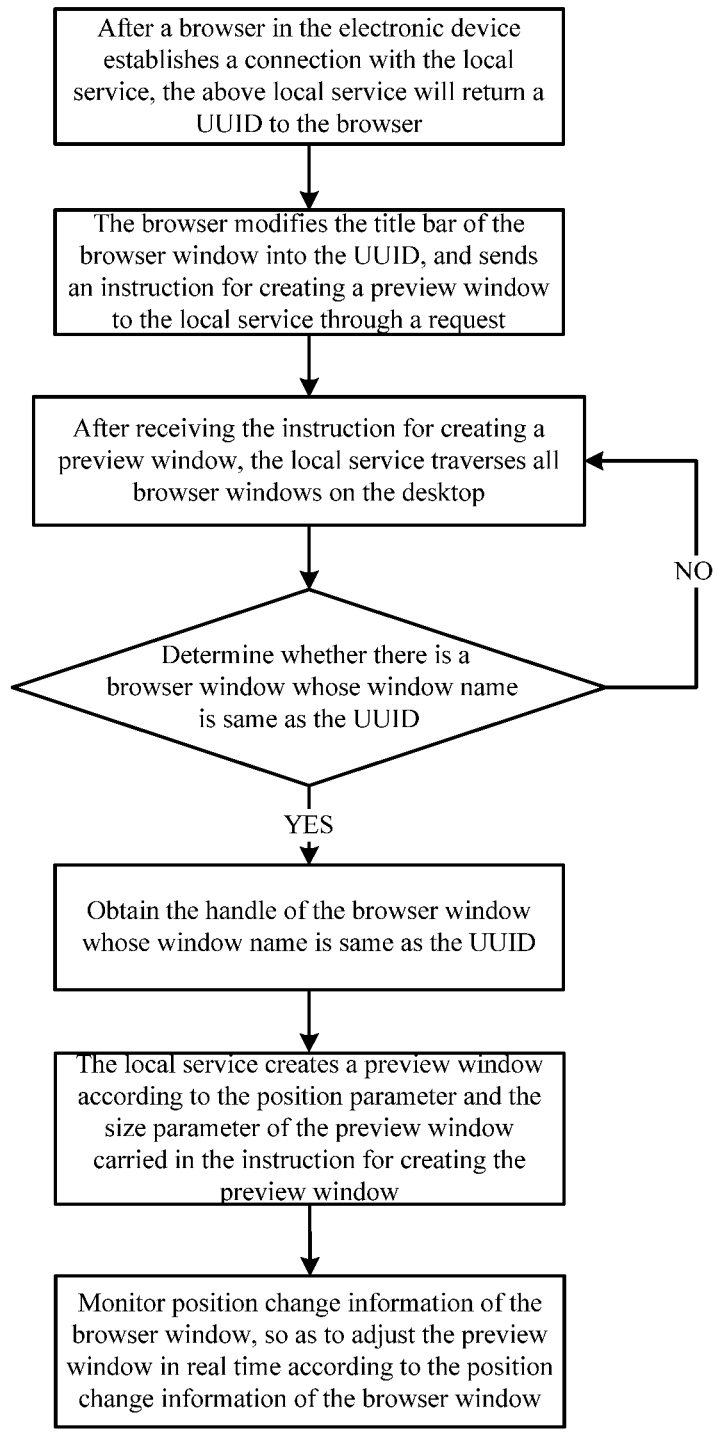
FIG. 2 is a first schematic flowchart of a local service displaying a video display window through a browser according to a following mode provided in the related art.
Figure 3:
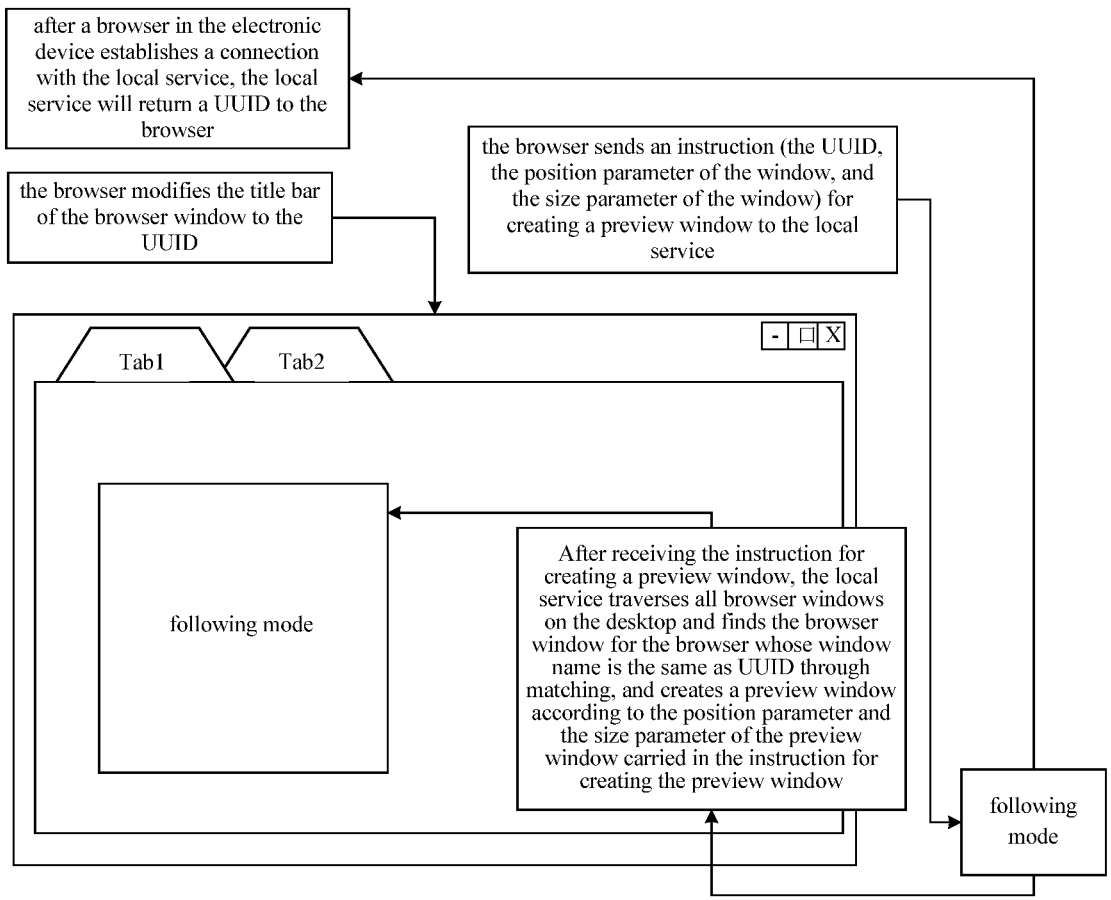
FIG. 3 is a second schematic flowchart of a local service displaying a video display window through a browser according to a following mode provided in the related art.

FIG. 2 is a schematic flowchart 1 of a local service displaying a video display window through a browser according to a following mode provided in the related art; FIG. 3 is a schematic flowchart 2 of a local service displaying a video display window through a browser according to a following mode provided in the related art. As shown in FIG. 2 and FIG. 3, after a browser in the electronic device establishes a connection with the above local service, the above local service will return a Universally Unique Identifier (UUID) to the browser, which is used as an identifier when the subsequent protocol-based interaction using instructions between the local service and the browser. The following description takes the video display window of the local service as a preview window as an example. The browser will modify a title bar of the browser window into the UUID, and send an instruction for creating a preview window to the local service through a request. Wherein, the instruction may carry the UUID above, position parameter of the preview window, size parameter of the preview window, etc. Other information may also be carried in the above instructions, which is not limited. After receiving the instruction for creating a preview window, the local service traverses all browser windows on the desktop and determines whether there is a browser window whose window name is same as the UUID; if yes, finds the browser window for the browser through matching, and obtains the handle of the browser window at the same time. The local service creates a preview window according to the position parameter and the size parameter of the preview window carried in the instruction for creating the preview window, and monitors display position change information of the browser window, so as to adjust the display position of the preview window in real time according to the display position change information of the browser window, so that the display position of the preview window changes with the display position of the browser window.

The browser window, i.e., the display window of the browser, can be understood as the main window corresponding to the browser. The preview window, i.e., the video display window of the local service, can be understood as the following window corresponding to the local service. The window name is the information in the title bar of the browser window.

Figure 4:
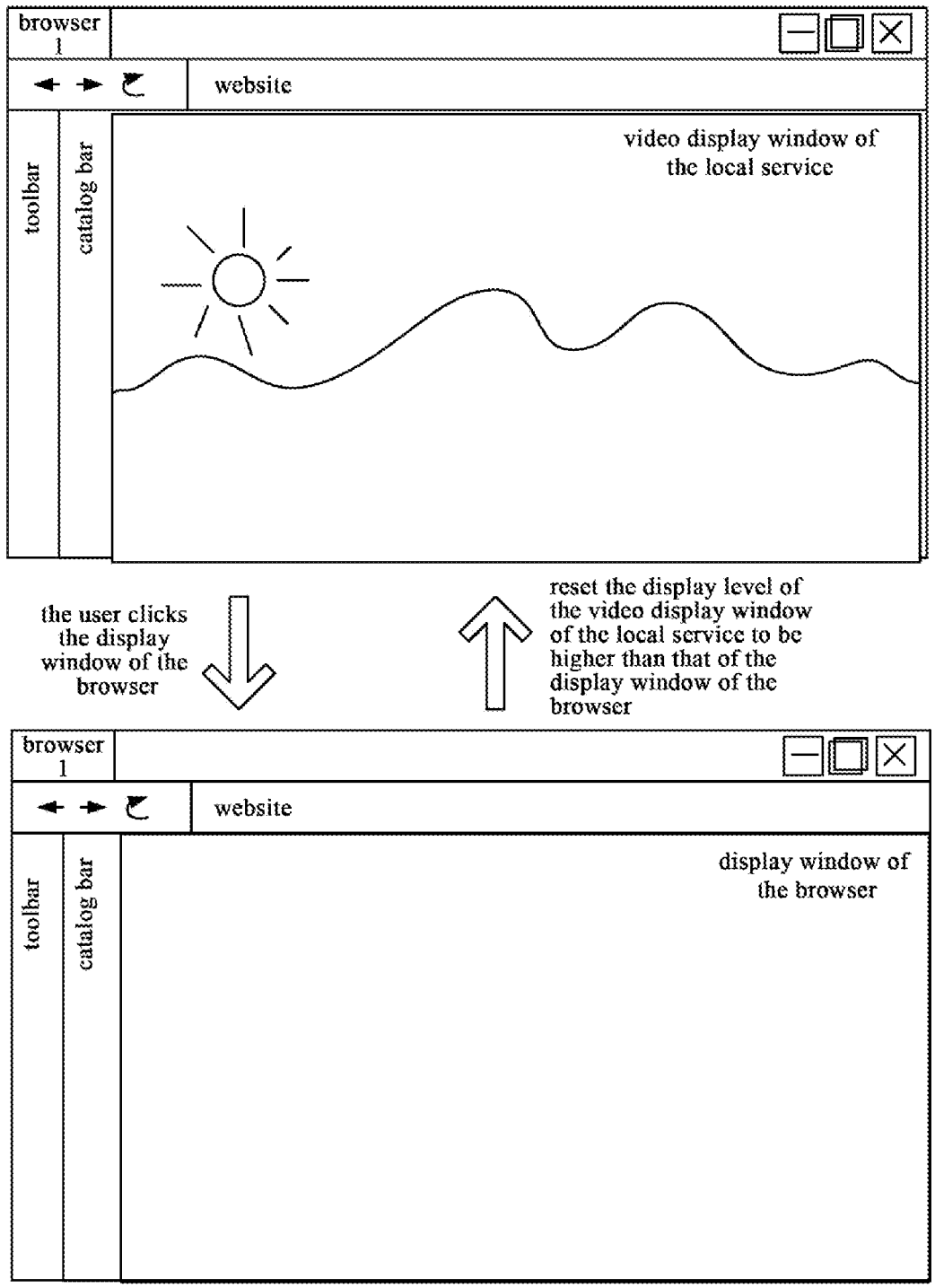
FIG. 4 is a schematic diagram illustrating the display when a user clicks a browser provided by the related art.

FIG. 4 is a schematic diagram illustrating the display when a user clicks a browser window provided by the related art. As shown in FIG. 4, since the local service and browser are two different applications in the electronic device, when the user clicks the display window of the browser, the display level of the display window of the browser will be set higher than that of the video display window, so that the display window of the browser will overlay the video display window. When monitoring that the display level of the display window of the browser is higher than that of the video display window, the local service will reset the display level of the video display window to be higher than that of the display window of the browser, so that the user can view the video display window again.

It can be seen that in the related art, when the display level of the display window of the browser is higher than that of the video display window, the display window of the browser will overlay the video display window. Although the local service resets the display level of the video display window to be higher than that of the display window of the browser, there is a flickering process visually for the user, resulting in poor display effect of the video display window in the following mode or the so-called following window.

In the window overlay display processing method and apparatus and the electronic device according to the embodiments of the present application, in a process of overlay-displaying a following window on a main window, an image is captured of display content of the following window according to an image capture time interval; and the captured image is displayed at a display position corresponding to the following window in the main window, so that when the display level of the main window is higher than that of the following window, that is, when the main window overlays the following window, the main window still displays the captured image corresponding to the display content of the following window. In this way, the user will think that he/she is continuing to view the display content of the following window, and will not feel flickering visually, thus solving the technical problem of poor display effect of the video display window in the following mode or the so-called following window in the related art.

The technical solution provided by the embodiment of the present application and how the technical solution provided by the embodiment of the present application solves the above technical problem will be explained in detail with specific embodiments below. The following specific embodiments may be combined with each other, and the same or similar concepts or processes may not be described in detail in some embodiments.

Figure 5:
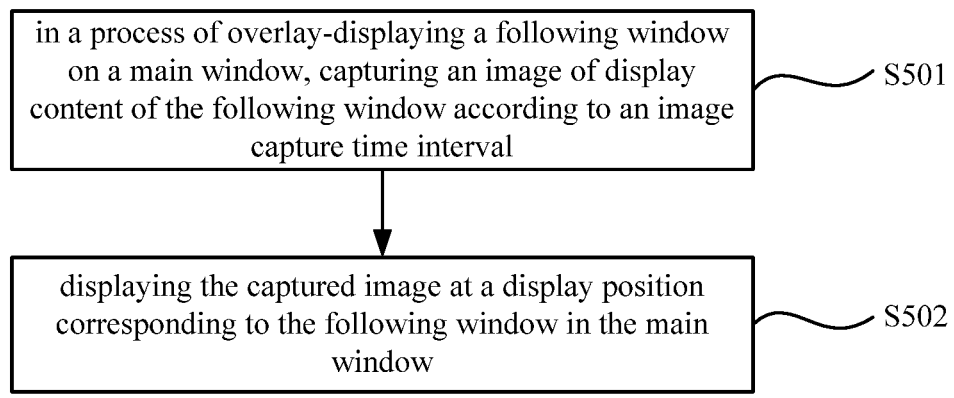
FIG. 5 is a schematic flowchart of a window overlay display processing method provided in an embodiment of the present application.

FIG. 5 is a schematic flowchart of a window overlay display processing method provided in an embodiment of the present application. The execution subject of the embodiment of the present application may be an electronic device or a window overlay display processing apparatus in the electronic device. For example, the window overlay display processing apparatus may be implemented by software and/or hardware. As shown in FIG. 5, the method of the embodiment of the present application may include:

S501, in a process of overlay-displaying a following window on a main window, capturing an image of display content of the following window according to an image capture time interval.

In this step, in the process of overlay-displaying the following window on the main window in the electronic device, the electronic device may capture an image of the display content of the following window regularly according to the image capture time interval, so as to obtain a picture including the display content of the following window. The image capture time interval may be a preset capture time interval in the electronic device, or may be a capture time interval predetermined before the electronic device executes the step S501. The image capture time interval may also be an image capture time interval obtained in other manners, which is not limited in this embodiment of the present application.

In this embodiment of the present application, capturing an image of the display content of the following window can be understood as capturing an image of the display content of the following window to obtain a picture including the display content of the following window.

Exemplarily, the following window may be a video display window of a local service in the electronic device; and/or, the main window may be a display window of a browser in the electronic device. It can be understood that the following window and the main window can also be other display windows in the electronic device, which is not limited in this embodiment of the present application.

In an embodiment of the present application, if the following window includes one sub-window, the captured image of the display content of the following window includes a captured image corresponding to the display content of the sub-window. If the following window includes a plurality of sub-windows, the captured image of the display content of the above following window includes a captured image corresponding to the display contents of the plurality of sub-windows.

Optionally, in a process of overlay-displaying the following window on the main window in the electronic device, an application for the following window in the electronic device may capture an image of the display content of the following window according to the image capture time interval, and push the captured image to an application for the main window in the electronic device, so as to display the captured image at a display position corresponding to the following window in the main window. Therefore, even when the display level of the main window is higher than that of the following window, since the main window still displays the captured image corresponding to the display content of the following window, the user will think that he/she is continuing to view the display content of the following window, and will not feel flickering visually.

In this embodiment of the present application, each time the application for the following window obtains one captured image, it pushes the captured image to the application for the main window. Therefore, the image capture time interval can be understood as a time interval that the application for the following window pushes the captured image to the application for the main window. To facilitate understanding, the time interval when the application for the following window pushes a captured image to the application for the main window is shortly referred to as a push time interval.

Exemplarily, if the application for the following window is a local service in the electronic device, the following window is a video display window of the local service. And/or, if the application for the main window may be a browser in the electronic device, the main window is the display window of the browser. It can be understood that the application for the following window and the application for the main window may also be other applications in the electronic device. Correspondingly, the following window and the main window can also be other display windows in the electronic device, which is not limited in the embodiment of the present application.

In a possible implementation, after the electronic device creates the following window, the following window is overlaid and displayed on the main window. In this case, the electronic device can capture an image of the display content of the following window according to the image capture time interval regardless of whether it has been monitored that the following window is in focus. In this way, the captured image displayed in the main window can be continuously updated, so that the most realistic captured image can be displayed in the main window.

In another possible implementation, after the electronic device creates the following window, the following window is overlaid and displayed on the main window, and the electronic device captures an image of the display content of the following window according to the image capture time interval. Subsequently, the electronic device will monitor that the following window is in focus and the main window is in focus. In this case, in order to save resource consumption, the electronic device can stop capturing the image of the display content of the following window according to the image capture time interval when monitoring that the main window is in focus. Subsequently when monitoring that the following window is in focus, the electronic device can start to capture an image of the display content of the following window according to the image capture time interval. In this way, it can not only avoid the problem of flickering visually when the main window is subsequently monitored to be in focus again, but also ensure that the most realistic captured image is displayed in the main window.

Exemplarily, the application for the following window in the electronic device may capture an image of the display content of the following window according to the image capture time interval when monitoring that the user selects the following window.

Optionally, if it is monitored that the number of sub-windows included in the following window is greater than a preset value (for example, 9 or 16, etc.), the content displayed by each of the sub-windows is relatively small, and the visual sensitivity of the user will be correspondingly low. At this time, the electronic device may increase the image capture time interval, and capture an image of the display content of the following window according to the increased image capture time interval. In this way, the display effect of the following window will not be affected, and the resource consumption can be further saved.

The above preset value may be set according to actual requirements, which is not limited.

It can be understood that, in order to ensure the push effect of the captured image of the display content of the following window, the image capture time interval cannot exceed a push time interval threshold, and the increased image capture time interval cannot exceed the push time interval threshold.

The push time interval threshold can be understood as a maximum push time interval that can meet visual requirements. When the visual requirements are low, the push time interval threshold may be set to a larger value; when the visual requirements are high, the push time interval threshold may be set to a smaller value.

S502, displaying the captured image at a display position corresponding to the following window in the main window.

In the embodiment of the present application, after capturing an image of the display content of the following window according to the image capture time interval, the electronic device will display the captured image at a display position corresponding to the following window in the main window. That is, the electronic device captures an image of the display content of the following window regularly according to the image capture time interval, and updates the captured image displayed at the display position corresponding to the following window in the main window with the captured image of the display content of the following window. Therefore, even when the display level of the main window is higher than that of the following window, that is, when the main window overlays the following window, since the main window still displays the captured image corresponding to the display content of the following window, the user will think that he/she is continuing to view the display content of the following window, and will not feel flickering visually.

Exemplarily, when receiving the captured image pushed by the application for the following window, the application for the main window in the electronic device can display the captured image at the display position corresponding to the following window in the main window.

In the embodiment of the present application, when monitoring that the display level of the main window is higher than that of the following window, that is, the main window overlays the following window, the electronic device can also reset the display level of the following window to be higher than that of the main window, that is, the following window overlays the main window, so that the user can view the display content of the following window again.

Exemplarily, the electronic device may call a preset system interface (an interface for setting the display level) to realize the setting of the display level. Wherein, for the specific interface calling methods, references can be made to the methods in related art.

To facilitate understanding, the following embodiment of the present application takes the following window as the video display window of the local service and the main window as the display window of the browser as an example to introduce the window overlay display processing method provided by the embodiment of the present application.

Figure 6:
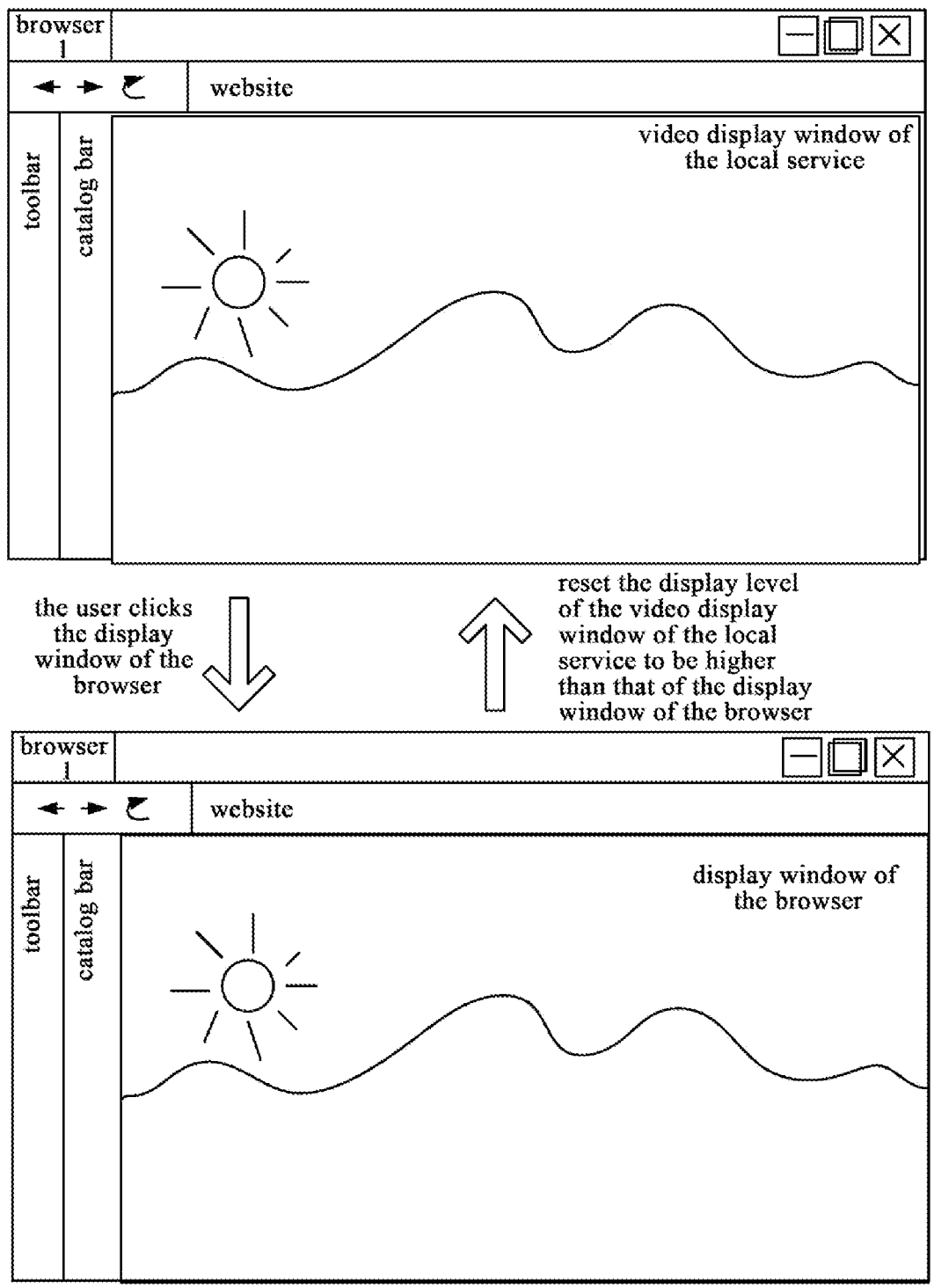
FIG. 6 is a schematic diagram illustrating the display when a user clicks a browser provided by an embodiment of the present application.

FIG. 6 is a schematic diagram illustrating the display when a user clicks a browser provided by an embodiment of the present application. As shown in FIG. 6, since the local service and the browser are two different applications in the electronic device, when the user clicks the display window of the browser, the display level of the display window of the browser will be higher than that of the video display window of the local service, so that the display window of the browser will overlay the video display window of the local service. However, since the display window of the browser still displays the captured image corresponding to the display content of the video display window, the user will think that he/she is continuing to view the display content of the video display window of the local service. At the same time, when monitoring that the display level of the display window of the browser is higher than that of the video display window, the electronic device resets the display level of the video display window to be higher than that of the display window of the browser, so that the user can view the video display window of the local service again. It can be seen that even when the display level of the display window of the browser is higher than that of the video display window, that is, when the display window of the browser overlays the video display window of the local service, since the display window of the browser still displays the captured image corresponding to the display content of the following window, the user will think that he/she is continuing to view the display content of the following window, and will not feel flickering visually.

To sum up, in the process of overlay-displaying the following window on the main window, an image is captured of display content of the following window according to the image capture time interval, and the captured image is displayed at a display position corresponding to the following window in the main window, so that when the display level of the main window is higher than that of the following window, that is, when the main window overlays the following window, the main window still displays the captured image corresponding to the display content of the following window. In this way, the user will think that he/she is continuing to view the display content of the following window, and will not feel flickering visually, thus improving the display effect of the following window and enhancing the user experience of viewing the following window.

It can be understood that when monitoring a change in the display position of the main window, the electronic device can also adjust the display position of the following window in the main window in real time according to the position information of the main window, so that the following window moves along with the display position of the main window.

Optionally, after monitoring that the main window is in focus, the electronic device sets the display level of the following window to be higher than that of the main window, and thus the following window continues to overlay the main window, so that the user can continue to view the display content of the following window. Therefore, the electronic device can stop capturing the image of the display content of the following window according to the image capture time interval, thereby further saving resource consumption.

In the embodiment of the present application, when monitoring that the main window is in focus, the electronic device immediately stops capturing an image of the display content of the following window according to the image capture time interval.

When monitoring that the main window is in focus, the electronic device first sets the display level of the main window to be higher than that of the following window, but then resets the display level of the following window to be higher than that of the main window. When the electronic device monitors that the main window is in focus, in the process that the electronic device sets the display level of the main window to be higher than that of the following window and resets the display level of the following window to be higher than that of the main window, the main window displays a captured image corresponding to the display content of the following window before the main window is in focus. After the electronic device resets the display level of the following window to be higher than that of the main window, the following window will overlay and be displayed on the main window again. Therefore, when the electronic device monitors that the main window is in focus, even if the image capture for the display content of the following window is stopped, the display content of the following window will always be displayed on the main window, and there is no visual flickering problem, and resource consumption is further saved.

Exemplarily, when monitoring that the user selects the main window, the application for the following window in the electronic device can stop capturing the image of the display content of the following window according to the image capture time interval, and stop pushing the captured image to the application for the main window, thus further saving the resource consumption.

Optionally, when monitoring that the display level of the following window is higher than that of the main window after monitoring that the main window is in focus, the electronic device stops capturing an image of the display content of the following window according to the image capture time interval, so as to ensure that the most realistic captured image is displayed in the main window.

Then, when monitoring that the following window is in focus, the electronic device starts to capture an image of the display content of the following window according to the image capture time interval.

On the basis of the above embodiment, before the step S501 is executed, the electronic device may also determine the image capture time interval based on the display content of the following window, so that the electronic device can capture an image of the display content of the following window regularly according to the image capture time interval, and display the captured image at the display position corresponding to the following window in the main window.

Exemplarily, the application for the following window in the electronic device may determine the image capture time interval based on the display content of the following window, so that the application for the following window may capture an image of the display content of the following window regularly according to the image capture time interval, and push the captured image to the application for the main window in the electronic device, so that the application for the main window displays the captured image at a display position corresponding to the following window in the main window.

In the following embodiments of the present application, the possible implementation of "determining the image capture time interval based on the display content of the following window" is introduced in detail.

In a possible implementation, if the display content of the following window includes a non-video content, the electronic device may determine the image capture time interval based on a preset push time interval. Exemplarily, the electronic device may determine that the image capture time interval is equal to the preset push time interval (e.g., 100 ms). In another possible implementation, if the display content of the following window includes a video content, the electronic device may determine the image capture time interval based on the video frame rate of the video content, so as to reduce the visual difference caused by the change in the images of the video content and improve the user experience.

The preset push time interval can be understood as a default time interval for the electronic device to display the captured image at the display position corresponding to the following window in the main window, or a default time interval for the application for the following window to push the captured image to the application for the main window. The default push time interval may be set according to the visual requirements and the performance of the electronic device. For example, the default time interval may be 100 ms, 150 ms, 200 ms, etc.

Exemplarily, if the following window includes one sub-window, the electronic device may take the video frame rate of the video content played by the sub-window as the video frame rate of the video content displayed by the following window. Alternatively, if the window of the following window includes a plurality of sub-windows, each of which is used to play the corresponding sub-video content, the electronic device may take the maximum video frame rate among video frame rates of the plurality of sub-video contents corresponding to the plurality of sub-windows as the video frame rate of the video content displayed by the following window. It can be understood that if the following window includes a plurality of sub-windows, the captured image of the display content of the above following window includes a captured image for the sub-video contents played by the plurality of sub-windows. Wherein, the video contents played in the sub-windows are called sub-video contents.

For example, the following window includes: sub-window ①, sub-window ② and sub-window ③ and sub-window ④, wherein the sub-window ① is used to display video content 1, the sub-window ② is used to display video content 2, the sub-window ③ is used to display video content 3, and the sub-window ④ is used to display video content 4. The video frame rate of the video content 2 is greater than the video frame rate of the video content 1, the video frame rate of the video content 3, and the video frame rate of the video content 4, then the electronic device may take the video frame rate of the video content 2 as the video frame rate of the video content displayed in the following window, and then calculate the image capture time interval.

Optionally, the electronic device determines the display duration of each video image based on the video frame rate of the video content displayed in the following window. Exemplarily, the electronic device may divide 1000 ms by the video frame rate to obtain the display duration of each video image. The electronic device may also determine the display duration of each video image based on the video frame rate in another way. Wherein, video images can be understood as video contents.

After determining the display duration of each video image, the electronic device determines whether the display duration of each video image is greater than a preset push time interval (e.g., 100 ms). If the display duration of each video image is greater than the preset push time interval, the electronic device may determine that the image capture time interval is equal to the preset push time interval. Alternatively, if the display duration of each video image is not greater than the preset push time interval, the electronic device may determine the image capture time interval based on the display duration of each video image.

Exemplarily, if the display duration of each video image is not greater than the preset push time interval, the electronic device may round down the display duration of each video image to a nearest integer to obtain the image capture time interval. For example, if the display duration of each video image is equal to 35.8 ms, the electronic device may round down the display duration 35.8 ms of each video image to a nearest integer, and the obtained capture time interval is 35 ms.

In the embodiment of the present application, rounding down the display duration of each video image to a nearest integer can be understand as taking the maximum integer time less than or equal to the display duration of each video image. For example, the display duration of each video image is equal to 35.8 ms, and the maximum integer time less than or equal to 35.8 ms is 35 ms. Therefore, the display duration 35.8 ms of each video image is rounded down, and the obtained capture time interval is 35 ms.

As another example, if the display duration of each video image is not greater than the preset push time interval, the electronic device may further round down the display duration of each video image to a nearest multiple of 10 ms to obtain the image capture time interval. For example, if the display duration of each video image is equal to 35.8 ms, the electronic device may round down the display duration 35.8 ms of each video image to a nearest multiple of 10 ms (e.g., 30 ms) as the image capture time interval.

In the embodiment of the present application, rounding down the display duration of each video image to a nearest multiple of 10 ms as the image capture time interval can be understood as taking the maximum integer time that is less than or equal to the display duration of each video image and is a multiple of 10 ms as the image capture time interval. For example, the display duration of each video image is equal to 35.8 ms, and the maximum integer time that is less than or equal to 35.8 ms and is a multiple of 10 ms is 30 ms. Therefore, the display duration 35.8 ms of each video image is rounded down to a nearest multiple of 10 ms, and the obtained capture time interval is 30 ms.

To sum up, in the embodiment of the present application, the electronic device determines the image capture time interval based on the display content of the following window, so that the electronic device can capture an image of the display content of the following window regularly according to the image capture time interval, and display the captured image at a display position corresponding to the following window in the main window. Therefore, even when the display level of the main window is higher than that of the following window, that is, when the main window overlays the following window, the main window still displays the captured image corresponding to the display content of the following window. In this way, the user will think that he/she is continuing to view the display content of the following window, and will not feel flickering visually, thus improving the display effect of the following window.

Figure 7:
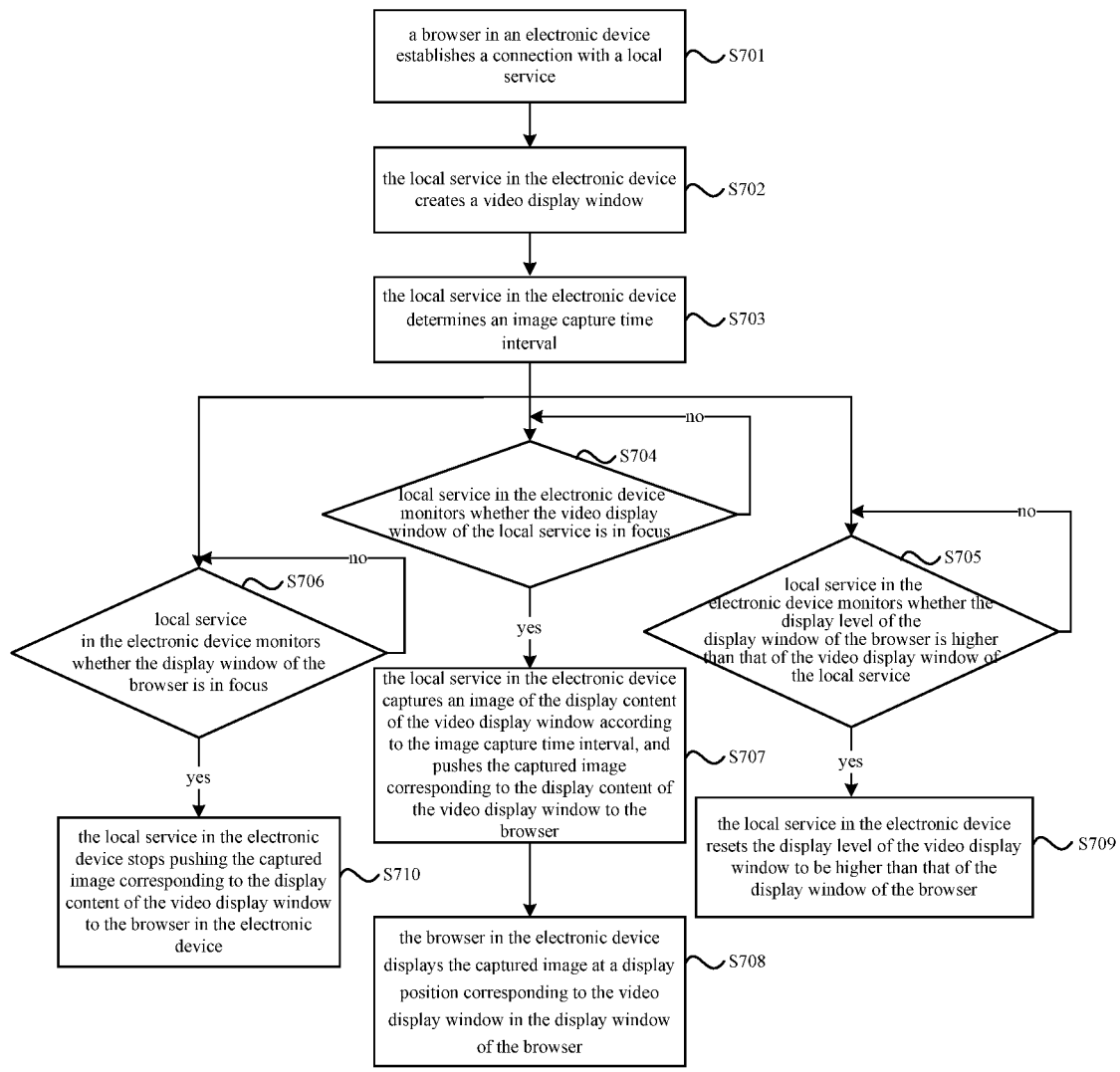
FIG. 7 is a schematic flowchart of a window overlay display processing method provided in another embodiment of the present application.

FIG. 7 is a schematic flowchart of a window overlay display processing method provided by another embodiment of the present application. On the basis of the above embodiments, in order to facilitate understanding, the window overlay display processing method provided by the embodiment of the present application will be introduced in the following embodiment of the present application by taking the application for the following window as the local service in the electronic device, the following window as the video display window of the local service, the application for the main window as the browser in the electronic device and the main window as the display window of the browser as examples. As shown in FIG. 7, the method provided by the embodiment of the present application may include:

At step S701, a browser in the electronic device establishes a connection with a local service.

At step S702, the local service in the electronic device creates a video display window.

At this time, the display level of the video display window is higher than that of the display window of the browser.

At step S703, the local service in the electronic device determines an image capture time interval.

Specifically, for the possible implementations for the local service in the electronic device to determine the image capture time interval, reference can be made to the relevant contents in the above embodiment of the present application, which will not be repeated here.

At this time, the local service in the electronic device captures an image of the display content of the video display window according to the image capture time interval, and pushes the captured image corresponding to the display content of the video display window to the browser until it is monitored that the display window of the browser is in focus. The browser in the electronic device displays the captured image at a display position corresponding to the video display window in the display window of the browser.

At step S704, the local service in the electronic device monitors whether the video display window of the local service is in focus.

Exemplarily, if it is monitored that the video display window of the local service is in focus, step S707 is executed; otherwise, continue to step S704.

At step S705, the local service in the electronic device monitors whether the display level of the display window of the browser is higher than that of the video display window of the local service.

Exemplarily, if it is monitored that the display level of the display window of the browser is higher than that of the video display window of the local service, step S709 is executed; otherwise, continue to step S705.

At step S706, the local service in the electronic device monitors whether the display window of the browser is in focus.

Exemplarily, if it is monitored that the display window of the browser is in focus, step S710 is executed; otherwise, continue to step S706.

As another example, if it monitored that the display window of the browser is in focus, and the local service monitors that the display level of the video display window of the local service is higher than the display level of the display window of the browser, step S710 is executed; otherwise, continue to step S706.

At step S707, the local service in the electronic device captures an image of the display content of the video display window according to the image capture time interval, and pushes the captured image corresponding to the display content of the video display window to the browser.

At step S708, the browser in the electronic device displays the captured image at a display position corresponding to the video display window in the display window of the browser.

In this step, the browser in the electronic device displays the captured image of the video display window at the display position corresponding to the video display window in the display window of the browser, so that when the display level of the display window of the browser is higher than that of the video display window, the display window of the browser still displays the captured image corresponding to the display content of the video display window. In this way, the user will think that he/she is continuing to view the display content of the video display window, and will not feel flickering visually.

At step S709, the local service in the electronic device resets the display level of the video display window to be higher than that of the display window of the browser.

At step S710, the local service in the electronic device stops pushing the captured image corresponding to the display content of the video display window to the browser in the electronic device.

In the embodiment of the present application, on the one hand, when it is monitored through the local service that the video display window for the local service is in focus, the electronic device captures an image of the display content of the video display window according to the determined capture time interval, and pushes the captured image corresponding to the display content of the video display window to the browser, so that the browser in the electronic device can display the captured image of the video display window at the display position corresponding to the video display window in the display window of the browser. Therefore, even when the display level of the display window of the browser is higher than that of the video display window, the display window of the browser still displays the captured image corresponding to the display content of the video display window. On the other hand, when monitoring that the display level of the display window of the browser is higher than that of the video display window, the local service in the electronic device resets the display level of the video display window to be higher than that of the display window of the browser, so that the user can view the display content of the video display window corresponding to the local service again. It can be seen that, in the embodiment of the present application, when the user clicks the browser in the process of viewing the video display window corresponding to the local service, even if the display level of the display window of the browser is higher than that of the video display window, that is, the display window of the browser overlays the video display window, since the display window of the browser still displays the captured image corresponding to the display content of the video display window corresponding to the local service. In this way, the user will think that he/she is continuing to view the display content of the video display window corresponding to the local service, and will not feel flickering visually, thus improving the display effect of the video display window in the following mode.

In the embodiment of the present application, when monitoring that the display window of the browser is in focus, the electronic device stops capturing the image of the display content of the video display window according to the determined capture time interval, and stops pushing the captured image corresponding to the display content of the video display window to the browser, thus saving resource consumption.

Figure 8:
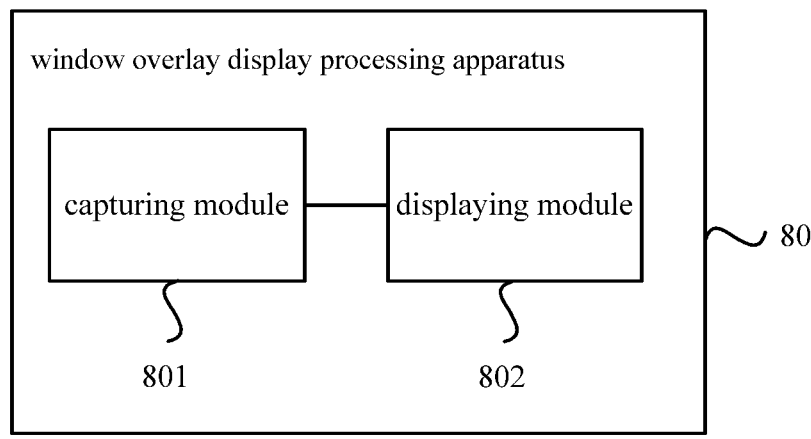
FIG. 8 is a structural schematic diagram of a window overlay display processing apparatus provided in an embodiment of the present application.

FIG. 8 is a structural schematic diagram of a window overlay display processing apparatus provided in an embodiment of the present application. Exemplarily, the window overlay display processing apparatus provided by the embodiment of the present application may be an electronic device, or may be an apparatus in an electronic device. As shown in FIG. 8, the window overlay display processing apparatus 80 provided by the embodiment of the present application may include an image capturing module 801 and a displaying module 802.

The image capturing module 801 is configured for, in a process of overlay-displaying a following window on a main window, capturing an image of display content of the following window according to an image capture time interval.

The displaying module 802 is configured for displaying the captured image at a display position corresponding to the following window in the main window.

In a possible implementation, the window overlay display processing apparatus 80 may further include:

a determining module is configured for determining the image capture time interval based on the display content of the following window.

In a possible implementation, the determining module includes:

a first determining unit is configured for determining the image capture time interval is equal to a preset push time interval if the display content of the following window includes a non-video content; or, a second determining unit is configured for determining the image capture time interval based on a video frame rate of the video content if the display content of the following window includes a video content.

In a possible implementation, the second determining unit may be specifically configured for:

determining a display duration of each video image based on the video frame rate of the video content;

determining whether the display duration of each video image is greater than a preset push time interval;

if the display duration of each video image is greater than the preset push time interval, determining that the image capture time interval is equal to the preset push time interval; or, if the display duration of each video image is not greater than the preset push time interval, rounding down the display duration of each video image to a nearest integer to obtain the image capture time interval; or, if the display duration of each video image is not greater than the preset push time interval, rounding down the display duration of each video image to a nearest multiple of 10 ms to obtain the image capture time interval.

In a possible implementation, if the following window includes a plurality of sub-windows, each of which is used to play a corresponding sub-video content, the video frame rate of the video content is a maximum video frame rate among video frame rates of the plurality of sub-video contents corresponding to the plurality of sub-windows.

In a possible implementation, the image capturing module 801 may be specifically configured for:

when it is monitored that the following window is in focus, capturing an image of the display content of the following window according to the image capture time interval;

when the following window is in focus, a display level of the following window is higher than that of the main window.

In a possible implementation, the image capturing module 801 may be specifically configured for:

if it is monitored that the number of sub-windows included in the following window is greater than a preset value, capturing an image of the display content of the following window according to an increased image capture time interval.

In a possible implementation, the image capturing module 801 may further be configured for:

when it is monitored that the main window is in focus, stopping capturing the image of the display content of the following window according to the image capture time interval.

In a possible implementation, the image capturing module 801 may further be configured for:

when it is monitored that a display level of the following window is higher than that of the main window after it is monitored that the main window is in focus, stopping capturing the image of the display content of the following window according to the image capture time interval.

In a possible implementation, the main window is a display window of a browser in an electronic device; and/or, the following window is a video display window of a local service in the electronic device.

The window overlay display processing apparatus provided in the embodiment of the present application may be used to implement the technical solution in the embodiment of the window overlay display processing method provided in the present application, and the implementation principles and technical effects thereof are similar, and will not be repeated here.

Figure 9:
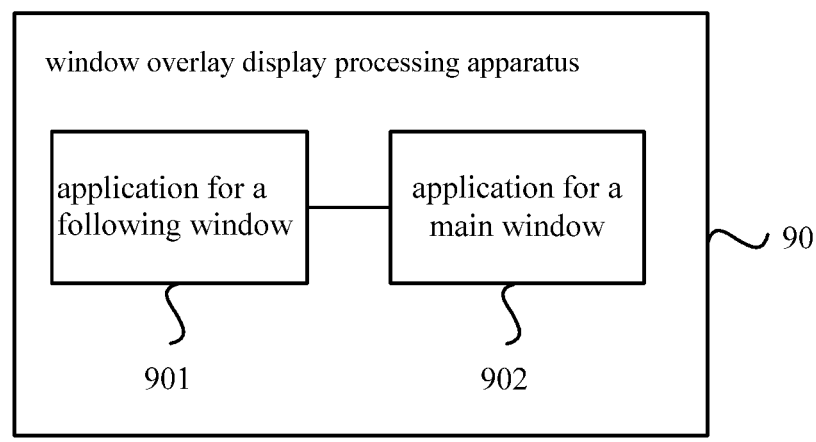
FIG. 9 is a structural schematic diagram of a window overlay display processing apparatus provided by another embodiment of the present application.

FIG. 9 is a structural schematic diagram of a window overlay display processing apparatus provided by another embodiment of the present application. Exemplarily, the window overlay display processing apparatus provided by the embodiment of the present application may be an electronic device, or may be an apparatus in an electronic device. As shown in FIG. 9, the window overlay display processing apparatus 90 provided by the embodiment of the present application may include an application 901 for a following window and an application 902 for a main window.

The application 901 for the following window is configured for, in a process of overlay-displaying the following window on the main window, capturing an image of display content of the following window according to an image capture time interval, and pushing the captured image to the application for the main window.

The application 902 for the main window is configured for displaying the captured image at a display position corresponding to the following window in the main window.

In a possible implementation, the application 901 for the following window may be further configured for, before capturing the image of the display content of the following window according to the image capture time interval, determining the image capture time interval based on the display content of the following window.

In a possible implementation, the application 901 for the following window may be specifically configured for:

if the display content of the following window includes a non-video content, determining the image capture time interval is equal to a preset push time interval; or, if the display content of the following window includes a video content, determining the image capture time interval based on a video frame rate of the video content.

In a possible implementation, the application 901 for the following window may be specifically configured for:

determining a display duration of each video image based on the video frame rate of the video content;

determining whether the display duration of each video image is greater than a preset push time interval;

if the display duration of each video image is greater than the preset push time interval, determining that the image capture time interval is equal to the preset push time interval; or, if the display duration of each video image is not greater than the preset push time interval, rounding down the display duration of each video image to a nearest integer to obtain the image capture time interval; or, if the display duration of each video image is not greater than the preset push time interval, rounding down the display duration of each video image to a nearest multiple of 10 ms to obtain the image capture time interval.

In a possible implementation, if the following window includes a plurality of sub-windows, each of which is used to play a corresponding sub-video content, the video frame rate of the video content is a maximum video frame rate among video frame rates of the plurality of sub-video contents corresponding to the plurality of sub-windows.

In a possible implementation, the application 901 for the following window may be specifically configured for:

when it is monitored that the following window is in focus, capturing an image of the display content of the following window according to the image capture time interval;

when the following window is in focus, a display level of the following window is higher than that of the main window.

In a possible implementation, the application 901 for the following window may be specifically configured for:

if it is monitored that the number of sub-windows included in the following window is greater than a preset value, capturing an image of the display content of the following window according to an increased image capture time interval.

In a possible implementation, the application 901 for the following window may further be configured for:

when it is monitored that the main window is in focus, stopping capturing the image of the display content of the following window according to the image capture time interval, and stopping pushing the captured image to the application 902 for the main window.

In a possible implementation, the application for the following window may further be configured for:

when it is monitored that a display level of the following window is higher than that of the main window after it is monitored that the main window is in focus, stopping capturing the image of the display content of the following window according to the image capture time interval, and stopping pushing the captured image to the application for the main window.

In a possible implementation, the application 902 for the main window is a browser in an electronic device; and correspondingly, the main window is a display window of the browser; and/or, the application 901 for the following window is a local service in the electronic device, and the following window is a video display window of the local service.

The window overlay display processing apparatus provided in the embodiment of the present application may be used to implement the technical solution in the embodiment of the window overlay display processing method in the present application, and the implementation principles and technical effects thereof are similar, and will not be repeated here.

Figure 10:
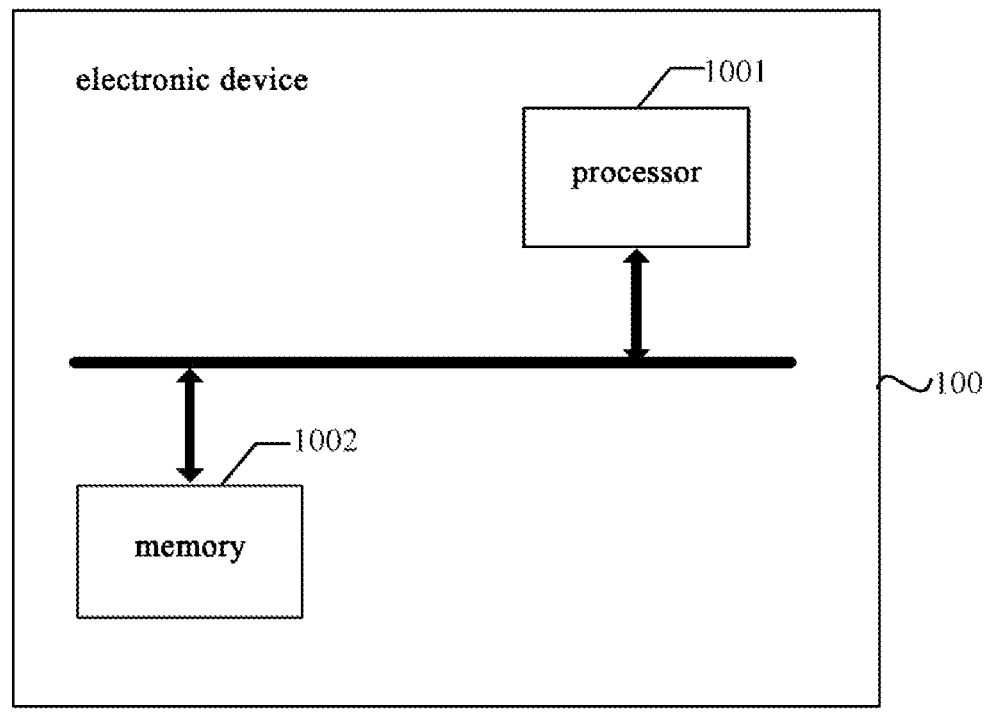
FIG. 10 is a structural diagram of an electronic device provided by an embodiment of the present application.

FIG. 10 is a structural diagram of an electronic device provided by an embodiment of the present application. As shown in FIG. 10, the electronic device 100 provided by the embodiment of the present application may include, but is not limited to, a processor 1001 and a memory 1002.

The memory 1002 is configured for storing program instructions.

The processor 1001 is configured for calling and executing the program instructions stored in the memory 1002, and the electronic device is configured for executing the technical solution in the embodiment of the window overlay display processing method provided in the present application when the processor executes the program instructions stored in the memory 1002, and the implementation principles and technical effects thereof are similar, and will not be repeated here.

An embodiment of the present application provides a computer-readable storage medium having stored instructions therein, wherein the instructions, when running on a computer, cause the computer to execute the technical solution in the embodiment of the window overlay display processing method provided in the present application, and the implementation principles and technical effects thereof are similar, and will not be repeated here.

An embodiment of the present application provides a computer program that, when running on a computer, causes the computer to execute the technical solution in the embodiment of the window overlay display processing method provided in the present application, and the implementation principles and technical effects thereof are similar, and will not be repeated here.

Those skilled in the art should understand that in various embodiments of the present application, the size of the sequence numbers of the above processes does not imply the sequence of execution, and the execution sequence of each process should be determined by its functions and internal logic, without any restriction on the implementation process of the present embodiment.

Those skilled in the art can clearly understand that, for the convenience and conciseness of description, only the division of the above-mentioned functional modules is taken as an example. In practical application, the above-mentioned functional may can be completed by different functional modules according to the needs, that is, the internal structure of the apparatus may be divided into different functional modules to complete all or some of the above-mentioned functions. For the specific working process of the above-mentioned apparatus, references can be made to the corresponding process in the above-mentioned method embodiment, which will not be repeated here.

Those skilled in the art can understand that all or some of the steps to realize the above-mentioned method embodiments can completed by hardware related to program instructions. The aforementioned program may be stored in a computer readable storage medium. When the program is executed, the steps included in the above method embodiments are executed; the aforementioned storage media include an Read-Only Memory (ROM), an Random Access Memory (RAM), a magnetic disk or an optical disk and other media that can store program codes.

Finally, it should be noted that the above embodiments are only used to illustrate the technical solution of the present application, but not to limit it. Although the application has been described in detail with reference to the aforementioned embodiments, those skilled in the art should understand that they can still modify the technical solution described in the aforementioned embodiments, or equivalently replace some or all of the technical features. These modifications or replacements do not make the essence of the corresponding technical solution depart from the scope of the technical solution of the embodiments of the present application.

What is claimed is:

1. A window overlay display processing method, comprising:
   in a process of overlay-displaying a following window on a main window displayed on a display device, capturing an image of display content of the following window according to an image capture time interval;
   wherein before capturing the image of the display content of the following window according to the image capture time interval:
   when the display content of the following window comprises a non-video content, determining that the image capture time interval is equal to a preset push time interval; and
   when the display content of the following window comprises a video content, determining the image capture time interval based on a video frame rate of the video content;
   displaying the captured image, on the display device, at a display position corresponding to the following window in the main window; and
   when it is monitored that the number of sub-windows included in the following window is greater than a preset value, capturing the image of the display content of the following window according to an increased image capture time interval.

2. The method according to claim 1, wherein determining the image capture time interval based on the video frame rate of the video content comprises:
   determining a display duration of each video image based on the video frame rate of the video content;
   determining whether the display duration of each video image is greater than the preset push time interval;
   when the display duration of each video image is greater than the preset push time interval, determining that the image capture time interval is equal to the preset push time interval; or,
   when the display duration of each video image is not greater than the preset push time interval, rounding down the display duration of each video image to a nearest integer to obtain the image capture time interval; or,
   when the display duration of each video image is not greater than the preset push time interval, rounding down the display duration of each video image to a nearest multiple of 10 ms to obtain the image capture time interval.

3. The method according to claim 1, wherein when the following window comprises a plurality of sub-windows, each of which is used to play a corresponding sub-video content, the video frame rate of the video content is a maximum video frame rate among video frame rates of the sub-video contents corresponding to the plurality of sub-windows.

4. The method according to claim 1, wherein capturing the image of the display content of the following window according to the image capture time interval comprises:
   when it is monitored that the following window is in focus, capturing the image of the display content of the following window according to the image capture time interval;
   when the following window is in focus, a display level of the following window is higher than that of the main window.

5. The method according to claim 1, wherein the method further comprises:
   when it is monitored that the main window is in focus, stopping capturing the image of the display content of the following window according to the image capture time interval.

6. The method according to claim 1, wherein the method further comprises:
   when it is monitored that a display level of the following window is higher than that of the main window after it is monitored that the main window is in focus, stopping capturing the image of the display content of the following window according to the image capture time interval.

7. The method according to claim 1, wherein the main window is a display window of a browser in an electronic device; and/or,
the following window is a video display window of a local service in the electronic device.

8. An electronic device for processing a window overly display, the device comprising:
a display device;
at least one processor; and
a memory storing a set of instructions that, when executed by the at least one processor, cause the at least one processor to:
in a process of overlay-displaying a following window on a main window displayed on the display device, capture an image of display content of the following window according to an image capture time interval;
wherein before capturing the image of the display content of the following window according to the image capture time interval:
when the display content of the following window comprises a non-video content, determining that the image capture time interval is equal to a preset push time interval; and
when the display content of the following window comprises a video content, determining the image capture time interval based on a video frame rate of the video content;
display the captured image, on the display device, at a display position corresponding to the following window in the main window; and
when it is monitored that the number of sub-windows included in the following window is greater than a preset value, capturing the image of the display content of the following window according to an increased image capture time interval.

9. An electronic device for processing a window overly display, comprising an application for a following window and an application for a main window, the device comprising;
a display device;
at least one processor; and
a memory storing a set of instructions that, when executed by the at least one processor, cause the at least one processor to run the application for the following window and the application for the main window,
wherein the application for the following window displayed on the display device is configured for, in a process of overlay-displaying the following window on the main window, capturing an image of display content of the following window according to an image capture time interval, and pushing the captured image to the application for the main window;
wherein before capturing the image of the display content of the following window according to the image capture time interval:
when the display content of the following window comprises a non-video content, determining that the image capture time interval is equal to a preset push time interval; and
when the display content of the following window comprises a video content, determining the image capture time interval based on a video frame rate of the video content;

the application for the main window is configured for displaying the captured image, on the display device, at a display position corresponding to the following window in the main window; and
when it is monitored that the number of sub-windows included in the following window is greater than a preset value, capturing the image of the display content of the following window according to an increased image capture time interval.

10. The device according to claim 9, wherein the application for the following window is specifically configured for:
determining a display duration of each video image based on the video frame rate of the video content;
determining whether the display duration of each video image is greater than a preset push time interval;
when the display duration of each video image is greater than the preset push time interval, determining that the image capture time interval is equal to the preset push time interval; or,
when the display duration of each video image is not greater than the preset push time interval, rounding down the display duration of each video image to a nearest integer to obtain the image capture time interval; or,
when the display duration of each video image is not greater than the preset push time interval, rounding down the display duration of each video image to a nearest multiple of 10 ms to obtain the image capture time interval.

11. The device according to claim 9, wherein when the following window comprises a plurality of sub-windows, each of which is used to play a corresponding sub-video content, the video frame rate of the video content is a maximum video frame rate among video frame rates of the sub-video contents corresponding to the plurality of sub-windows.

12. The device according to claim 9, wherein the application for the following window is specifically configured for:
when it is monitored that the following window is in focus, capturing the image of the display content of the following window according to the image capture time interval;
when the following window is in focus, a display level of the following window is higher than that of the main window; or
wherein the application for the following window is specifically configured for:
wherein the application for the following window is further configured for:
when it is monitored that the main window is in focus, stopping capturing the image of the display content of the following window according to the image capture time interval, and stopping pushing the captured image to the application for the main window; or
wherein the application for the following window is further configured for:
when it is monitored that a display level of the following window is higher than that of the main window after it is monitored that the main window is in focus, stopping capturing the image of the display content of the following window according to the image capture time interval, and stopping pushing the captured image to the application for the main window.

13. The device according to claim 9, wherein the application for the main window is a browser in an electronic device; and
- the main window is a display window of the browser; and/or,
- the application for the following window is a local service in the electronic device, and the following window is a video display window of the local service.

14. A non-transitory computer-readable storage medium having stored instructions therein, wherein the instructions, when running on an electronic device, cause the computer to execute the method according to claim 1.

* * * * *